United States Patent
Soled et al.

(10) Patent No.: US 7,544,632 B2
(45) Date of Patent: *Jun. 9, 2009

(54) BULK NI-MO-W CATALYSTS MADE FROM PRECURSORS CONTAINING AN ORGANIC AGENT

(75) Inventors: Stuart L. Soled, Pittstown, NJ (US); Sabato Miseo, Pittstown, NJ (US); Zhiguo Hou, Baton Rouge, LA (US)

(73) Assignee: Exxonmobil Research and Engineering Company, Annandale, NJ (US)

( * ) Notice: Subject to any disclaimer, the term of this patent is extended or adjusted under 35 U.S.C. 154(b) by 516 days.

This patent is subject to a terminal disclaimer.

(21) Appl. No.: 11/227,727

(22) Filed: Sep. 14, 2005

(65) Prior Publication Data

US 2006/0060503 A1 Mar. 23, 2006

Related U.S. Application Data

(60) Provisional application No. 60/612,044, filed on Sep. 22, 2004, provisional application No. 60/612,110, filed on Sep. 22, 2004.

(51) Int. Cl.
- *B01J 31/00* (2006.01)
- *B01J 27/24* (2006.01)
- *B01J 27/047* (2006.01)
- *B01J 27/051* (2006.01)
- *B01J 27/049* (2006.01)
- *B01J 27/043* (2006.01)

(52) U.S. Cl. .......... 502/200; 502/150; 502/162; 502/164; 502/167; 502/219; 502/220; 502/221; 502/222

(58) Field of Classification Search ........... 502/150, 502/162, 164, 167, 200, 219–222
See application file for complete search history.

(56) References Cited

U.S. PATENT DOCUMENTS

| | | | | |
|---|---|---|---|---|
| 4,243,553 | A * | 1/1981 | Naumann et al. | 502/220 |
| 4,540,482 | A | 9/1985 | Seiver et al. | 208/215 |
| 4,839,326 | A * | 6/1989 | Halbert et al. | 502/220 |
| 4,902,404 | A | 2/1990 | Ho | 208/57 |
| 4,960,506 | A | 10/1990 | Halbert et al. | 208/215 |
| 5,319,119 | A | 6/1994 | Kaneshima et al. | 556/14 |
| 6,712,955 | B1 * | 3/2004 | Hou et al. | 208/216 R |
| 6,758,963 | B1 | 7/2004 | Hantzer et al. | 208/213 |
| 2006/0060502 | A1 * | 3/2006 | Soled et al. | 208/111.3 |

FOREIGN PATENT DOCUMENTS

| | | |
|---|---|---|
| EP | 0133031 | 2/1985 |
| WO | 2006/036609 | * 4/2006 |
| WO | 2006/036610 | * 4/2006 |

* cited by examiner

*Primary Examiner*—Patricia L Hailey

(57) ABSTRACT

Novel bulk tri-metallic catalysts for use in the hydroprocessing of hydrocarbon feeds, as well as a method for preparing such catalysts. The catalysts are prepared from a catalyst precursor containing an organic agent.

18 Claims, 4 Drawing Sheets

FIGURE 3-A
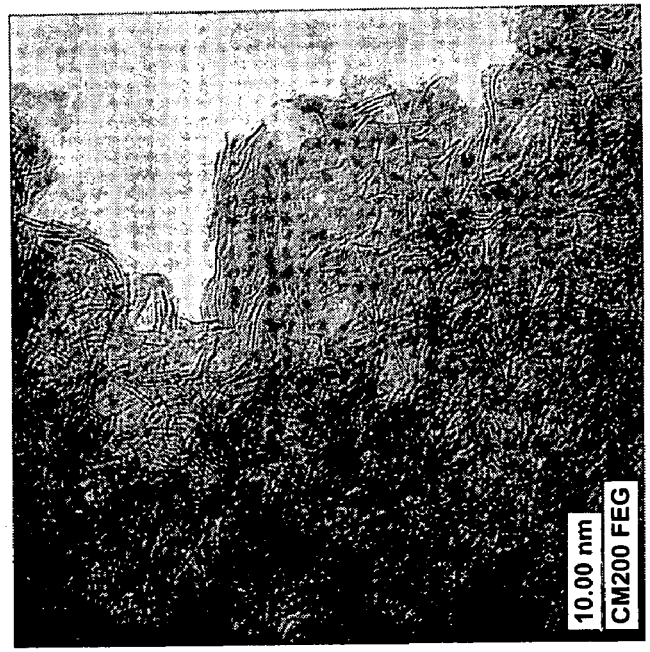
*Ni-Mo-W-S from oxide precursor:*
*45Å stack height : ~ 7-8 sheets*
FIGURE 3-B
*Ni-Mo-W-S from surfactant-Ni-Mo-W-O*
*precursor: 15Å stack height : ~ 2.5 sheets*

BULK NI-MO-W CATALYSTS MADE FROM PRECURSORS CONTAINING AN ORGANIC AGENT

CROSS REFERENCE TO RELATED APPLICATION

This application claims benefit of U.S. Provisional Patent Application Ser. Nos. 60/612,044 and 60/612,110, both filed Sep. 22, 2004.

FIELD OF THE INVENTION

This invention relates to bulk tri-metallic catalysts for use in the hydroprocessing of hydrocarbon feeds, as well as a method for preparing such catalysts. The catalysts are prepared from a catalyst precursor containing an organic agent.

BACKGROUND OF THE INVENTION

Environmental and regulatory initiatives are requiring ever-lower levels of both sulfur and aromatics in distillate fuels. For example, proposed sulfur limits for distillate fuels to be marketed in the European Union for the year 2005 is 50 wppm or less. There are also regulations that will require lower levels of total aromatics in hydrocarbons and, more specifically, to lower levels of multiring aromatics found in distillate fuels and heavier hydrocarbon products. Further, the maximum allowable aromatics level for U.S. on-road diesel, CARB reference diesel, and Swedish Class I diesel are 35, 10 and 5 vol. %, respectively. Further, the CARB and Swedish Class I diesel fuel regulations allow no more than 1.4 and 0.02 vol. % polyaromatics, respectively. Consequently, much work is presently being done in the hydrotreating art because of these proposed regulations.

Hydrotreating, or in the case of sulfur removal, hydrodesulfurization, is well known in the art and typically requires treating the petroleum streams with hydrogen in the presence of a supported catalyst at hydrotreating conditions. The catalyst is usually comprised of a Group VI metal with one or more Group VIII metals as promoters on a refractory support, such as alumina. Hydrotreating catalysts that are particularly suitable for hydrodesulfurization, as well as hydrodenitrogenation, generally contain molybdenum or tungsten on alumina promoted with a metal such as cobalt, nickel, iron, or a combination thereof. Cobalt promoted molybdenum on alumina catalysts are most widely used when the limiting specifications are hydrodesulfurization. Nickel promoted molybdenum on alumina catalysts are the most widely used for hydrodenitrogenation, partial aromatic saturation, as well as hydrodesulfurization.

One approach to prepare improved hydrotreating catalysts involved a family of phases structurally related to hydrotalcites and derived from the parent ammonium nickel molybdate. Whereas X-ray diffraction analysis has shown that hydrotalcites are composed of layered phases with positively charged sheets and exchangeable anions located in the galleries between the sheets, the related ammonium nickel molybdate phase has molybdate anions in interlayer galleries bonded to nickel oxyhydroxide sheets. See, for example, Levin, D., Soled, S. L., and Ying, J. Y., "Crystal Structure of an Ammonium Nickel Molybdate prepared by Chemical Precipitation," *Inorganic Chemistry*, Vol. 35, No. 14, p. 4191-4197 (1996). The preparation of such materials also has been reported by Teichner and Astier, *Appl. Catal.* 72, 321-29 (1991), *Ann. Chim. Fr.* 12, 337-43 (1987), and *C. R. Acad. Sci.* 304 (II), #11, 563-6 (1987) and Mazzocchia, *Solid State Ionics*, 63-65 (1993) 731-35.

Another relatively new class of hydrotreating catalysts is described in U.S. Pat. Nos. 6,156,695, 6,162,350 and 6,299,760, all of which are incorporated herein by reference. The catalysts described in these patents are bulk multi-metallic catalysts comprised of at least one Group VIII non-noble metal (X) and at least two Group VIB metals, wherein the ratio of Group VIB metal to Group VIII non-noble metal is from about 10:1 to about 1:10. These catalysts are prepared from a precursor having the formula:

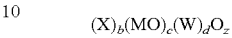

wherein the molar ratio of b:(c+d) is 0.5/1 to 3/1, the molar ratio of c:d is >0.01/1, preferably >0.1/1 and z=[2b+6(c+d)]/2. The precursor has x-ray diffraction peaks at d=2.53 and 1.70 Angstroms. The precursor is sulfided to produce the corresponding activated catalyst.

While such catalysts have proven to be superior to hydrotreating catalyst before their time, there still remains a need in the art for ever-more reactive and effective catalysts for removing heteroatoms, such as nitrogen and sulfur from hydrocarbon streams.

SUMMARY OF THE INVENTION

In an embodiment, there is provided a bulk trimetallic catalyst composition represented by the formula:

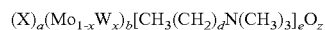

wherein X is one or more Group VIII non-noble metals, d is an integer from about 10 to about 40, x is between 0 and 1, the molar ratio of c:a is $\leq 2.0/1$ and z=((2a+6b)+e)/2 and the molar ratio of a: (b) is 0.5/1 to 3/1; and wherein said catalyst after sulfidation, is comprised of stacked layers of $(Mo_{1-x}W_x)$ $S_2$ stoichiometry, such that the average stack height is about 10 Å to about 20 Å.

In a preferred embodiment, the molar ratio of a:b is from about 0.75/1 to about 1.5/1, and d is from about 16 to about 20, most preferably about 18, and e is between about 0.5 and about 1.5.

In a preferred embodiment of the present invention, x is between about 0.1 and about 0.9, more preferably about 0.5.

BRIEF DESCRIPTION OF DRAWINGS

FIG. 3a is a transmission electron micrograph of a prior art Ni—Mo—W-sulfided catalyst prepared from an oxide precursor as taught in U.S. Pat. No. 6,156,695 showing a stack height of about 45 Å (about 7-8 sheets).

FIG. 3b is a transmission electron micrograph of the Ni—Mo—W-sulfided catalyst of the present invention prepared from an organic agent (amine surfactant) method of the present invention showing a stack height of about 15 Å (about 2.5 sheets).

DETAILED DESCRIPTION OF THE INVENTION

Figure 1:
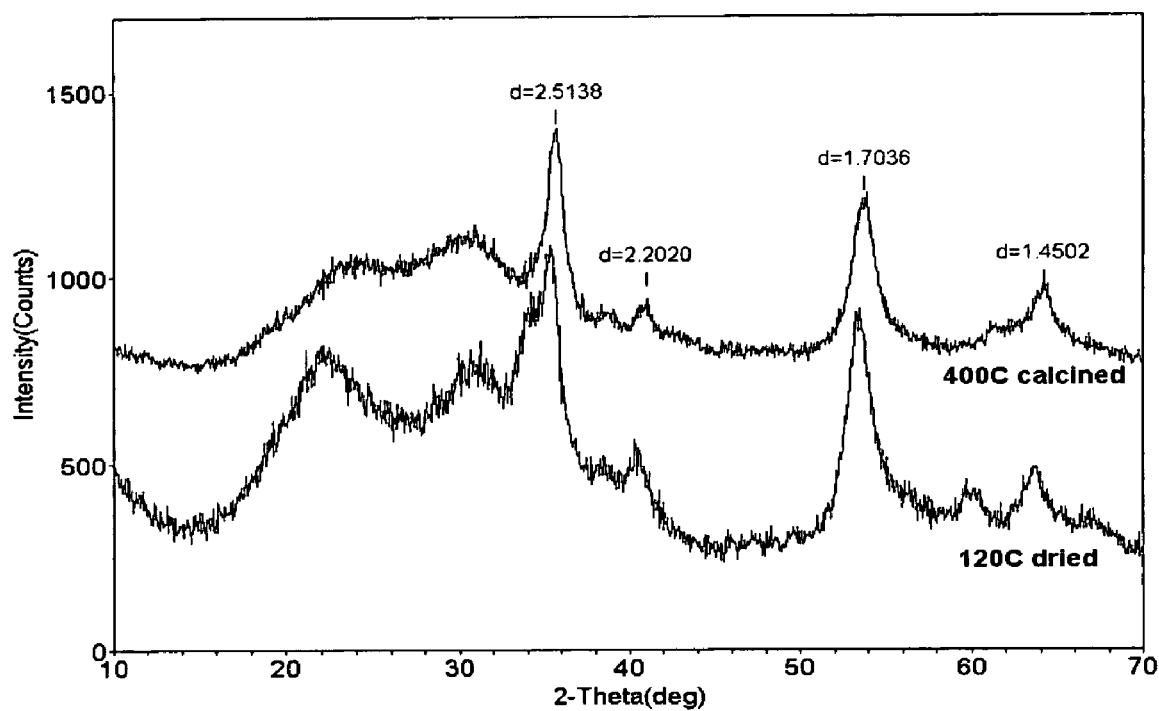
FIG. 1 shows X-ray diffraction patterns of a Ni 1.5 Mo 0.5 W 0.5-oxide phase (top trace) prepared according to Example 1 hereof and the catalyst precursor NiMo0.5W0.5[CH$_3$ (CH$_2$)$_{17}$N(CH$_3$)$_3$]0.75-oxide phase (bottom trace) in accordance with Example 2 hereof.

The bulk multi-metallic catalyst compositions of the present invention can be used in virtually all hydroprocessing processes to treat a plurality of feeds under wide-ranging reaction conditions such as temperatures from about 200 to about 450° C., hydrogen pressures from about 5 to about 300 bar, liquid hourly space velocities from about 0.05 to about 10 $h^{-1}$ and hydrogen treat gas rates from about 35.6 to about 1780 $m^3/m^3$ (200 to 10,000 SCF/B). The term "hydroprocessing" encompasses all processes in which a hydrocarbon feed is reacted with hydrogen at the temperatures and pressures noted above, and includes hydrodemetallation, hydrodewaxing, hydrotreating, hydrogenation, hydrodesulfurization, hydrodenitrogenation, hydrodearomatization, hydroisomerization, and hydrocracking including selective hydrocracking. Depending on the type of hydroprocessing and the reaction conditions, the products of hydroprocessing may show improved viscosities, viscosity indices, saturates content, low temperature properties, volatilities and depolarization. It is to be understood that hydroprocessing of the present invention can be practiced in one or more reaction zones and in either countercurrent flow or cocurrent flow mode. By countercurrent flow mode we mean a process mode wherein the feedstream flows countercurrent to the flow of hydrogen-containing treat gas. The hydroprocessing reactor can also be operated in any suitable catalyst-bed arrangement mode. For example, it can be a fixed bed, slurry bed, or ebulating bed.

A wide range of petroleum and chemical feedstocks can be hydroprocessed in accordance with the present invention. Suitable feedstocks include whole and reduced petroleum crudes, atmospheric and vacuum residua, propane deasphalted residua, e.g., brightstock, cycle oils, FCC tower bottoms, gas oils, including atmospheric and vacuum gas oils and coker gas oils, light to heavy distillates including raw virgin distillates, hydrocrackates, hydrotreated oils, dewaxed oils, slack waxes, Fischer-Tropsch waxes, raffmates, naphthas, and mixtures thereof.

The instant invention can be practiced in one or more stages or zones. In one preferred multistage process, a distillate boiling range feedstock containing high levels of sulfur and nitrogen can be conducted to a first hydrodesulfurization reaction stage for the removal of a substantial amount of the sulfur and nitrogen. Suitable feeds are those containing in excess of about 3,000 wppm sulfur and are typically raw virgin distillates. The product stream is passed to a separation zone wherein a vapor phase product stream and a liquid phase product stream are produced. The liquid phase product stream is then passed to a second, independently selected hydrodesulfurization stage, which also contains one or more reaction zones, where it is further hydrodesulfurized in the presence of hydrogen and a second hydrodesulfurization catalyst. This will typically result in a product stream containing from about 50 to about 600 wppm sulfur. It is preferred that the product stream contain from the second hydrodesulfurization stage contain less than about 150 wppm sulfur, more preferably less than about 100 wppm sulfur, and most preferably less than about 50 wppm sulfur. This twice hydrodesulfurized product stream will be passed to a third reaction stage and be reacted in the presence of hydrogen and a catalyst capable of further reducing the sulfur level and hydrogenating aromatics. The sulfur level of the final product stream will be less than about 10 wppm, preferably less than about 5 wppm, and more preferably less than about 1 wppm sulfur. This third reaction stage will contain, at least one reaction zone, at least one of which contains a hydrogenation catalyst and, optionally, a third independently selected hydrodesulfurization catalyst, such as the bulk multi-metallic catalyst of the present invention. It is within the scope of this invention that at least a portion of the vapor product stream from either or both reaction stages can be recycled to the first reaction stage.

At least one of the reaction zones of at least one of the reaction stages will contain at least one bed of the bulk multi-metallic catalyst of the present invention. For example, the reactor of the first hydrodesulfurization stage can contain a plurality of reaction zones in a stacked bed arrangement wherein a conventional hydrodesulfurization catalyst comprises one or more, but not all, reaction zones and the bulk multi-metallic catalyst of the present invention comprises the other one or more reaction zones. It is preferred that a conventional hydrodesulfurization catalyst be used in an upstream reaction zone and a multi-metallic catalyst of the present invention be used in a downstream reaction zone. It is more preferred that all of the reaction zones of this first hydrodesulfurization stage contain the bulk multi-metallic catalyst of this invention.

Non-limiting examples of conventional hydrotreating catalysts that can be used in the practice of the present invention along with the bulk multi-metallic catalyst include those that are comprised of at least one Group VIII metal, preferably Fe, Co or Ni, more preferably Co and/or Ni, and most preferably Co; and at least one Group VI metal, preferably Mo or W, more preferably Mo, on a relatively high surface area support material, preferably alumina. Other suitable hydrodesulfurization catalyst supports include zeolites, amorphous silica, silica-alumina, and titania-alumina Noble metal catalysts can also be employed, preferably when the noble metal is selected from Pd and Pt. It is within the scope of the present invention that more than one type of hydrodesulfurization catalyst be used in the same reaction vessel. The Group VIII metal is typically present in an amount ranging from about 2 to about 20 wt. %, preferably from about 4 to about 12 wt. %. The Group VI metal will typically be present in an amount ranging from about 5 to about 50 wt. %, preferably from about 10 to about 40 wt. %, and more preferably from about 20 to about 30 wt. %. All metals weight percents are on support. By "on support" is meant that the percents are based on the weight of the support. For example, if the support were to weigh 100 g., then 20 wt. % Group VIII metal would mean that 20 g. of Group VIII metal was on the support.

In another embodiment, a two-stage process is used wherein the feedstock to the first reaction stage will be the same feedstock as for the three reaction stage process, except that the product stream from the first stage will contain about 300 to about 1,500 wppm, preferably from about 300 to about 1,000 wppm, and more preferably from about 300 to about 750 wppm sulfur. The second reaction stage will then preferably contain both the bulk multi-metallic catalyst of this invention as well as an aromatic hydrogenation catalyst. The final product stream will contain less than about 30 wppm, preferably less than about 20 wppm sulfur and a substantially lower level of aromatics.

Non-limiting examples of aromatic hydrogenation catalysts that can be used in the practice of the present invention include nickel, cobalt-molybdenum, nickel-molybdenum, and nickel tungsten. Non-limiting examples of noble metal catalysts include those based on platinum and/or palladium, which is preferably supported on a suitable support material, typically a refractory oxide material such as alumina, silica, alumina-silica, kieselguhr, diatomaceous earth, magnesia, and zirconia. Zeolitic supports can also be used. Such catalysts are typically susceptible to sulfur and nitrogen poisoning. The aromatic saturation zone is preferably operated at a temperature from about 40° C. to about 400° C., more preferably from about 260° C. to about 350° C., at a pressure from about 100 psig to about 3,000 psig, preferably from about 200 psig to about 1,200 psig, and at a liquid hourly space velocity (LHSV) of from about 0.3 V/V/Hr. to about 2.0 V/V/Hr.

The preferred bulk trimetallic catalyst precursor compositions used in the practice of the present invention is represented by the formula:

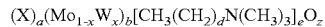

wherein X is one or more Group VIII non-noble metals, d is an integer from about 10 to about 40, x is between 0 and 1, the molar ratio of c:a is $\leq 2.0/1$ and $z=((2a+6b)+e)/2$ and the molar ratio of a: (b) is about 0.5/1 to about 3/1; and wherein said catalyst after sulfidation, is comprised of $(Mo_{1-x}W_x)S_2$ stacked layers, such that the average stack height is about 10 Å to about 20 Å.

In a preferred embodiment, the molar ratio of a:b is from about 0.75/1 to about 1.5/1 and d is from about 16 to 20, most preferably 18 and e is between 0.5 and 1.5.

In a preferred embodiment of the present invention, x is between about 0.1 and about 0.9, more preferably about 0.5.

Prior art catalysts, such as those taught in U.S. Pat. Nos. 6,156,695, 6,162,350 and 6,299,760 teach the preparation of catalysts similar to those of the instant invention, but are prepared from oxides not containing an organic agent,

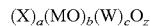

wherein the molar ratio of b, c, and d, are such that $0.1<(b+c)/a<10$, and $z=[2a+6(b+c)]/2$. The precursor has x-ray diffraction peaks at d=2.53 and 1.70 Angstroms.

This invention is based, in part, on the discovery that catalysts prepared using an organic agent precursor composition of the present invention results in a final catalyst uniquely different than those prepared using the oxide precursor without an organic agent. For example, the preparation of such catalysts without the organic agent, after activation by sulfidation, results in active sulfide phase crystallites having a normal $[(Mo,W)S_2]$ layer structure having a stack height of about 45 Å (about 7 to 8 layers) and a crystallite diameter of about 50 Å. On direct sulfidation with a non-carbon containing sulfidation media (i.e., $H_2S/H_2$), the organic agent Ni—Mo—W phase appears to produce a carbosulfide rather than a sulfide phase as those catalysts prepared without the use of an organic agent. The supported carbosulfide phase is unexpectedly more active for hydrodesulfurization than prior art bulk tri-metallic bulk catalysts. The sulfided catalyst of the present invention that are prepared using the organic agent-containing precursor results in a carbosulfide phase with substantially smaller stack height (about 15 Å).

The organic agent R is selected from the group consisting of aromatic amines, cyclic aliphatic amines and polycyclic aliphatic amines, preferably aromatic amines such as $C_4$ to $C_{20}$ aromatic amines, e.g., pyrrolidine.

The organic directing agent R for use in the above method for synthesizing the present material from the reaction mixture is an ammonium or

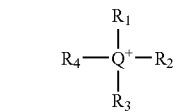

phosphonium ion of the formula $R_1 R_2 R_3 R_4 Q^+$, i.e.:

wherein Q is nitrogen or phosphorus and wherein at least one of $R_1$, $R_2$, $R_3$ and $R_4$ is aryl or alkyl of from about 8 to about 36 carbon atoms, e.g., —$C_{10}H_{21}$, —$C_{16}H_{33}$ and —$C_{18}H_{37}$, or combinations thereof, the remainder of $R_1$, $R_2$, $R_3$ and $R_4$ being selected from the group consisting of hydrogen, alkyl of from 1 to 5 carbon atoms and combinations thereof. Non-limiting examples of these directing agents suitable for use herein include cetyltrimethylammonium, cetyltrimethylphosphonium, octadecyltrimethylphosphonium, cetylpyridinium, myristyltrimethylammonium, decyltrimethylammonium, dodecyltrimethylammonium and dimethyldidodecylammonium. The compound from which the above ammonium or phosphonium ion is derived may be, for example, the hydroxide, halide, silicate, or mixtures thereof.

The preferred method of preparing the catalysts used in the practice of the present invention comprises preparing a solution of all precursor components then heating the solution resulting in a precipitate to form a precursor catalyst composition. It is particularly preferred to make a solution of an ammonium salt of a Group VIB metal and a solution of a Group VIII non-noble metal nitrate. Both solutions are heated to a temperature of about 60° C. to about 150° C., preferably about 90° C., an organic agent, such as an amine surfactant, is added to the Group VIB metal solution. The pressure will be from about atmospheric to autogenous. The Group VIII non-noble metal solution is added to the Group VIB metal solution and direct precipitation of the Group VIB and Group VIII non-noble metal components occurs. This synthesis can also be conducted at lower temperature and/or decreased pressure or higher temperature and/or increased pressure. Suitable Group VIB and Group VIII non-noble metal components are water-soluble nickel, molybdenum and tungsten components. If soluble salts are added as such, they will dissolve or disperse in the reaction mixture and subsequently be precipitated. Suitable Group VIB metal salts which are soluble in water are preferably ammonium salts such as ammonium dimolybdate, ammonium tri-, tetra- hepta-, octa-, and tetradeca-molybdate, ammonium para-, meta-, hexa-, and polytungstate, alkali metal salts, silicic acid salts of Group VIB metals such as molybdic silicic acid, molybdic silicic tungstic acid, tungstic acid, metatungstic acid, pertungstic acid, heteropolyanion compounds of Mo—P, Mo—Si, W—P, and W—Si. It is also possible to add Group VIB metal-containing compounds which are not in solution at the time of addition, but where solution is effected in the reaction mixture. Examples of such compounds are metal compounds that contain so much crystal water that upon temperature increase they will dissolve in their own metal water. Further, non-soluble metal salts may be added in suspension or as such, and solution is effected in the reaction mixture. Suitable non-soluble metals salts are heteropolyanion compounds of Co—Mo—W (moderately soluble in cold water) and heteropolyanion compounds of Ni—Mo—W (moderately soluble in cold water).

Precipitation can be effected by adding a Group VIII non-noble metal salt solution to the Group VIB metal solution in the presence of the amine organic agent and heating the mixture to effectuate the precipitation. The precipitate obtained by this process will have, after sulfidation, a relatively high catalytic activity relative to conventional hydroprocessing catalysts, which typically comprise a carrier impregnated with Group VIII non-noble metals and Group VIB metals. For purposes of this invention, the precipitate is used without a support. Unsupported catalyst compositions are usually referred to as bulk catalysts.

The bulk catalyst precursor composition of the present invention can generally be directly formed into various catalyst shapes depending on the intended commercial use. These shapes can be made by any suitable technique, such as by extrusion, pelletizing, beading, or spray drying. If the amount of liquid of the bulk catalyst composition is so high that it cannot be directly subjected to a shaping step, a solid-liquid separation can be performed before shaping. Optionally, the bulk catalyst composition, either as such or after solid-liquid separation, can be calcined before shaping The median diameter of the bulk catalyst precursor particles is at least 50 µm, more preferably at least 100 µm, and preferably not more than 5000 µm and more preferably not more than 3000 µm. Even more preferably, the median particle diameter lies in the range of about 0.1 to about 50 µm and most preferably in the range of about 0.5 to about 50 µm.

Binder material can be used in the preparation of the catalyst precursor composition it including material that is conventionally used as a binder in hydroprocessing catalysts. Non-limiting examples of suitable binder materials include silica, silica-alumina, such as conventional silica-alumina, silica-coated alumina and alumina-coated silica, alumina such as (pseudo) boehmite, or gibbsite, titania, zirconia, cationic clays or anionic clays such as saponite, bentonite, kaoline, sepiolite or hydrotalcite, or mixtures thereof. Preferred binder materials are silica, silica-alumina, alumina, titanic, zirconia, or mixtures thereof. These binders may be applied as such or after peptization. It is also possible to apply precursors of these binders that, during precursor synthesis, are converted into any of the above-described binders. Suitable precursors are, e.g., alkali metal aluminates (to obtain an alumina binder), water glass (to obtain a silica binder), a mixture of alkali metal aluminates and water glass (to obtain a silica alumina binder), a mixture of sources of a di-, tri-, and/or tetravalent metal such as a mixture of water-soluble salts of magnesium, aluminum and/or silicon (to prepare a cationic clay and/or anionic clay), chlorohydrol, aluminum sulfate, or mixtures thereof.

If desired, the binder material can be composited with a Group VIB metal and/or a Group VIII non-noble metal, prior to being composited with the bulk catalyst composition and/or prior to being added during the preparation thereof. Compositing the binder material with any of these metals may be carried out by impregnation of the solid binder with these materials. Those having ordinary skill in the art would know suitable impregnation techniques. If the binder is peptized, it is also possible to carry out the peptization in the presence of Group VIB and/or Group VIII non-noble metal components.

If alumina is used as binder, the surface area will preferably be in the range of about 100 to about 400 m$^2$/g, and more preferably about 150 to about 350 m$^2$/g, measured by the B.E.T. method. The pore volume of the alumina is preferably in the range of about 0.5 to about 1.5 ml/g measured by nitrogen adsorption.

Generally, the binder material to be used has less catalytic activity than the bulk catalyst composition or no catalytic activity at all. Consequently, by using a binder material, the activity of the bulk catalyst composition may be reduced. Therefore, the amount of binder material to be used will generally depends on the desired activity of the final catalyst composition. Binder amounts from about 0 to about 95 wt. % of the total composition can be suitable, depending on the envisaged catalytic application. However, to take advantage of the resulting unusual high activity of the composition of the present invention, binder amounts to be added are generally in the range of about 0.5 to about 75 wt. % of the total composition.

Prior to or during shaping, additives can be used to facilitate shaping, including conventional shaping additives. These additives may comprise aluminum stearate, surfactants, graphite or mixtures thereof. These additives can be added at any stage prior to the shaping step. Further, when alumina is used as a binder, it may be desirable to add acids prior to the shaping step such as nitric acid to increase the mechanical strength of the extrudates.

It is preferred that a binder material, if used, be added prior to the shaping step. Further, it is preferred that the shaping step is carried out in the presence of a liquid, such as water. Preferably, the amount of liquid in the extrusion mixture, expressed as LOI is in the range of about 20 to about 80%.

The resulting shaped catalyst precursor composition can, after an optional drying step, be calcined. Calcination however is not essential for precursor synthesis. If a calcination is carried out, it can be done at a temperature of, e.g., from about 100° C. to about 600° C. and preferably about 350° C. to about 500° C. for a time varying from about 0.5 to about 48 hours. The drying of the shaped particles is generally carried out at temperatures above 100° C.

In a preferred embodiment of the invention, the catalyst precursor composition is subjected to spray drying, (flash) drying, milling, kneading, or combinations thereof prior to shaping. These additional process steps can be conducted either before or after a binder is added, after solid-liquid separation, before or after calcination and subsequent to re-wetting. It is believed that by applying any of the above-described techniques of spray drying, (flash) drying, milling, kneading, or combinations thereof, the degree of mixing between the bulk catalyst composition and the binder material is improved. This applies to both cases where the binder material is added before or after the application of any of the above-described methods. However, it is generally preferred to add the binder material prior to spray drying and/or any alternative technique. If the binder is added subsequent to spray drying and/or any alternative technique, the resulting composition is preferably thoroughly mixed by any conventional technique prior to shaping. An advantage of, e.g., spray drying is that no wastewater streams are obtained when this technique is applied.

A cracking component may be added during catalyst preparation. When used, the cracking component will represent about 0 to 80 wt. % of the final catalyst, based on the total weight of the catalyst. The cracking component may serve, for example as an isomerization enhancer. Conventional cracking components can be used, such as a cationic clay, an anionic clay, a zeolite such as ZSM-5, (ultra-stable) zeolite Y, zeolite X, ALPO's, SAPO's, amorphous cracking components such as silica-alumina, or mixtures thereof. It is to be understood that some materials may act as a binder and a cracking component at the same time. For instance, silica-alumina may have at the same time a cracking and a binding function.

If desired, the cracking component may be composited with a Group VIB metal and/or a Group VIII non-noble metal prior to being composited with the bulk catalyst composition and/or prior to being added during the preparation thereof.

Compositing the cracking component with any of these metals may be carried out by impregnation of the cracking component with these materials.

Generally, the selection of particular cracking components, if any, depends on the envisaged catalytic application of the final catalyst composition. A zeolite is preferably added if the resulting composition is applied in hydrocracking or fluid catalytic cracking. Other cracking components such as silica-alumina or cationic clays are preferably added if the final catalyst composition shall be used in hydrotreating applications. The amount of cracking material that is added depends on the desired activity of the final composition and the application envisaged and thus may vary from about 0 to about 80 wt. %, based on the total weight of the catalyst composition.

If desired, further materials can be added in addition to the metal components already added, such as any material that would be added during conventional hydroprocessing catalyst preparation. Suitable examples are phosphorus compounds, boron compounds, fluorine-containing compounds, additional transition metals, rare earth metals, fillers, or mixtures thereof.

Suitable phosphorus compounds include ammonium phosphate, phosphoric acid, or organic phosphorus compounds. Phosphorus compounds can be added at any stage of the process of the present invention prior to the shaping step and/or subsequent to the shaping step. If the binder material is peptized, phosphorus compounds can also be used for peptization. For instance, the binder can be peptized by contacting the binder with phosphoric acid or with a mixture of phosphoric and nitric acid.

Suitable additional transition metals are, e.g., rhenium, ruthenium, rhodium, iridium, chromium, vanadium, iron, cobalt, platinum, palladium, cobalt, nickel, molybdenum, or tungsten. These metals can be added at any stage of the process of the present invention prior to the shaping step. Apart from adding these metals during the process of the invention, it is also possible to composite the final catalyst composition therewith. It is, e.g., possible to impregnate the final catalyst composition with an impregnation solution comprising any of these metals.

Synthesis of the bulk catalyst compositions will comprise a precursor sulfidation step. Sulfidation is generally carried out by contacting the catalyst precursor composition with a sulfur-containing compound such as elementary sulfur, hydrogen sulfide or polysulfides. The sulfidation can generally be carried out subsequent to the preparation of the bulk catalyst composition but prior to the addition of a binder material, and/or subsequently to the addition of the binder material but prior to subjecting the catalyst composition to spray drying and/or any alternative method, and/or subsequently to subjecting the composition to spray drying and/or any alternative method but prior to shaping, and/or subsequently to shaping the catalyst composition. It is preferred that the sulfidation not be carried out prior to any process step that reverts the obtained metal sulfides into their oxides. Such process steps are, e.g., calcination or spray drying or any other high temperature treatment in the presence of oxygen. Consequently, if the catalyst composition is subjected to spray drying and/or any alternative technique, the sulfidation should be carried out subsequent to the application of any of these methods.

If the catalyst composition is used in a fixed bed process, the sulfidation is preferably carried out subsequent to the shaping step and, if calcination is used, subsequent to the last calcination step. Preferably, the sulfidation is carried out ex situ, i.e., the sulfidation is carried out in a separate reactor prior to loading the sulfided catalyst composition into the hydroprocessing unit. Furthermore, it is preferred that the catalyst composition is both sulfided ex situ and in situ.

It has been found herein that the bulk catalyst particles of the present invention are sintering-resistant. Thus, the active surface area of the bulk catalyst particles is maintained during use. The molar ratio of Group VIB to Group VIII non-noble metals ranges generally from about 10:1 to about 1:10 and preferably from about 3:1 to about 1:3. In the case of a core-shell structured particle, these ratios of course apply to the metals contained in the shell. If more than one Group VIB metal is contained in the bulk catalyst particles, the ratio of the different Group VIB metals is generally not critical. The same holds when more than one Group VIII non-noble metal is applied. In the case where molybdenum and tungsten are present as Group VIB metals, the molybenum:tungsten ratio preferably lies in the range of about 9:1 to about 1:9. Preferably the Group VIII non-noble metal comprises nickel and/or cobalt. It is further preferred that the Group VIB metal comprises a combination of molybdenum and tungsten. Preferably, combinations of nickel/molybdenum/tungsten and cobalt/molybdenum/tungsten and nickel/cobalt/molybdenum/tungsten are used. These types of precipitates appear to be sinter-resistant. Thus, the active surface area of the precipitate is remained during use.

The metals are preferably present as oxidic compounds of the corresponding metals, or if the catalyst composition has been sulfided, sulfidic compounds of the corresponding metals. Some of the carbonaceous components of the organic agent remain in the catalyst after sulfiding. While not being bound by theory, the authors believe that the incorporation of the carbonaceous material into the sulfide intercepts the growth of the sulfide stacks during conversion of the oxide to the sulfide and results in lower stack height material.

The surface area of the catalyst composition preferably is at least about 40 $m^2/g$, more preferably at least about 80 $m^2/g$ and most preferably at least about 120 $m^2/g$, as measured by the B.E.T. method. The total pore volume of the catalyst composition is preferably at least about 0.05 ml/g and more preferably at least about 0.1 ml/g as determined by water porosimetry. To obtain catalyst compositions with high mechanical strength, it may be desirable that the catalyst composition of the invention has a low macroporosity. It is furthermore preferred that the particles comprise about 50 to about 100 wt. %, and even more preferably about 70 to about 100 wt. % of at least one Group VIII non-noble metal and at least one Group VIB metal, based on the total weight of the particles, calculated as metal oxides. The amount of Group VIB and Group VIII non-noble metals can easily be determined via TEM-EDX.

Process conditions applicable for the use of the catalysts described herein may vary widely depending on the feedstock to be treated. Thus, as the boiling point of the feed increases, the severity of the conditions will also increase. The following table serves to illustrate typical conditions for a range of feeds.

| FEED | TYPICAL BOILING RANGE ° C. | TEMP. ° C. | PRESS, BARS | SPACE VELO-CITY V/V/HR | $H_2$ GAS RATE SCF/B |
|---|---|---|---|---|---|
| Naphtha | 25-210 | 100-370 | 10-60 | 0.5-10 | 100-2,000 |
| Diesel | 170-350 | 200-400 | 15-110 | 0.5-4 | 500-6,000 |
| Heavy | 325-475 | 260- | 15-170 | 0.3-2 | 1000-6,000 |

-continued

| FEED | TYPICAL BOILING RANGE ° C. | TEMP. ° C. | PRESS, BARS | SPACE VELO- CITY V/V/HR | H₂ GAS RATE SCF/B |
|---|---|---|---|---|---|
| Gas Oil | | 430 | | | |
| Lube Oil | 290-550 | 200-450 | 6-210 | 0.2-5 | 100-10,000 |
| Residuum | 10-50% > 575 | 340-450 | 65-1100 | 0.1-1 | 2,000-10,000 |

The following examples will serve to illustrate, but not limit, this invention.

EXAMPLE 1

28.8 g of $MoO_3$ (0.2 mole Mo) and 50.0 g of tungstic acid $H_2WO_4$ (0.2 mole W) were slurried in 800 ml of water (suspension A) and heated to 90° C. 70.6 g of nickel hydroxycarbonate $2NiCO_3*3Ni(OH)_2*4H_2O$ (0.6 mole of Ni) were suspended in 200 ml of water and heated to 90° C. (suspension B). Suspension B was slowly added to suspension A during a 60-minute period, and the resulting mixture was maintained at 90° C. for a period of 18 hours with continuous stirring. At the end of this time, the resulting suspension was filtered and the solids were dried at 120° C. for 4-8 hours and calcined at 400° C. The yield was about 99%, based on the calculated weight of all metal components having been converted to their oxides. The X-ray spectrum for this bulk catalyst precursor oxide composition is shown as the upper trace in FIG. 1 hereof.

EXAMPLE 2

A catalyst precursor of nominal composition $Ni_1Mo_{.5}W_{.5}$ oxide with octadecytrimethylammonium incorporated therein was prepared as follows: into 500 cc of water, 17.65 g of ammonium heptamolybdate (0.10 moles Mo) and 24.5 g of ammonium metatungstate (0.10 moles W) was dissolved. To this was added 58.9 g of octadecyltrimethylammonium bromide (0.15 moles), which gave a solution of pH 5.7. This solution was heated to 90° C. and formed a milky slurry. To this was added 58.15 g of nickel nitrate (0.20 moles Ni) that had been first dissolved in 100 cc of additional water. The entire mixture was then heated and stirred in a three-necked flask containing a reflux condensor and thermometer to 90° C. and held at that temperature for one hour. The final pH measured 4.2. After filtering and drying at 120° C., the resulting solid weighed 63.5 grams. The X-ray diffraction spectra of this precursor is shown as the bottom trace in FIG. 1 hereof.

EXAMPLE 3

Figure 2:
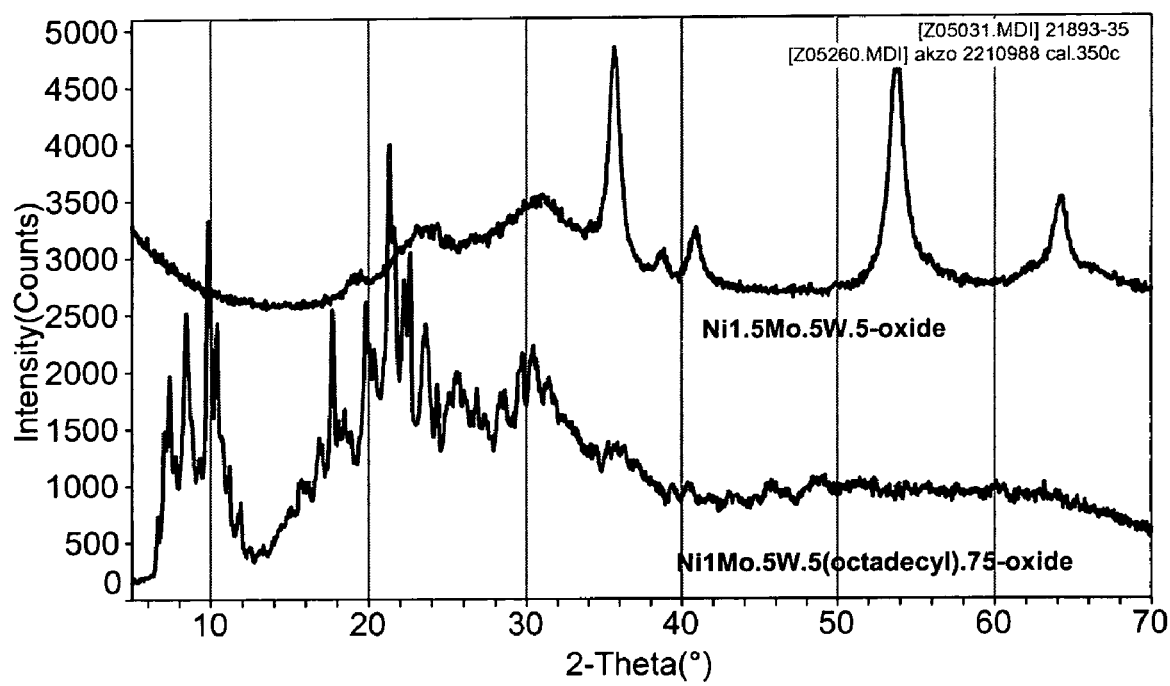
FIG. 2 shows X-ray diffraction patterns of a Ni1.5Mo0.5W0.5-sulfided (top trace), and the bottom trace being NiMo0.5W0.5[(CH$_2$)$_{18}$]0.75-sulfided (bottom trace) both of Example 3 hereof.

4-6 grams of catalysts from Examples 1 and 2 hereof were dried at 120° C. and placed in a quartz boat that was in turn inserted into a horizontal quartz tube and placed into a Lindberg furnace. While still at room temperature, a flow of 200 cc/min 10% $H_2S/H_2$ was admitted for 15 minutes, then the temperature was raised to 400° C. in 45 minutes with the 10% $H_2S/H_2$ flowing at 200 cc/min. This flow was continued for 2 hours at 400° C. The heat was then turned off and the resulting catalyst was cooled in flowing $H_2S/H_2$ to room temperature and held at room temperature for about 30 minutes under the same flow. Then 300 cc/min of nitrogen was admitted for 30 minutes. After that, a 1% oxygen in helium passivation gas was admitted at room temperature and flowed at 50 cc/min overnight. The sample was then removed from the furnace. The resulting X-ray diffraction spectra was measured on the two samples and are shown in FIG. 2 hereof. The top trace is the sulfided neat oxide sample and the bottom trace is the sulfided oxide-amine surfactant (organic agent) precursor of Ni—Mo—W. It will be noted in this FIG. 2 the broadening of the (002) peak (at about 12 degrees) for the precursor containing the amine surfactant. This broadening usually occurs as a result of a decrease in stacking height of the sulfide sheets.

EXAMPLE 4

Samples of the sulfided precursors of Example 3 hereof were crushed into pieces (less than 100 mm thick), dusted onto holey-carbon coated TEM grids, and examined in a bright field TEM imaging mode of a Phillips CM200F instrument. 250-350 different crystals of the sulfided precursor were examined and the stack heights counted and averaged. FIGS. 3a and 3b hereof show the representative TEM micrographs of these stacks as well as the stack height measurements. This TEM data evidences that the organic agent-containing sulfide precursors (FIG. 3b) give a lower stack height sulfide when compared to those prepared without the organic agent (FIG. 3a).

EXAMPLE 5

Figure 4:
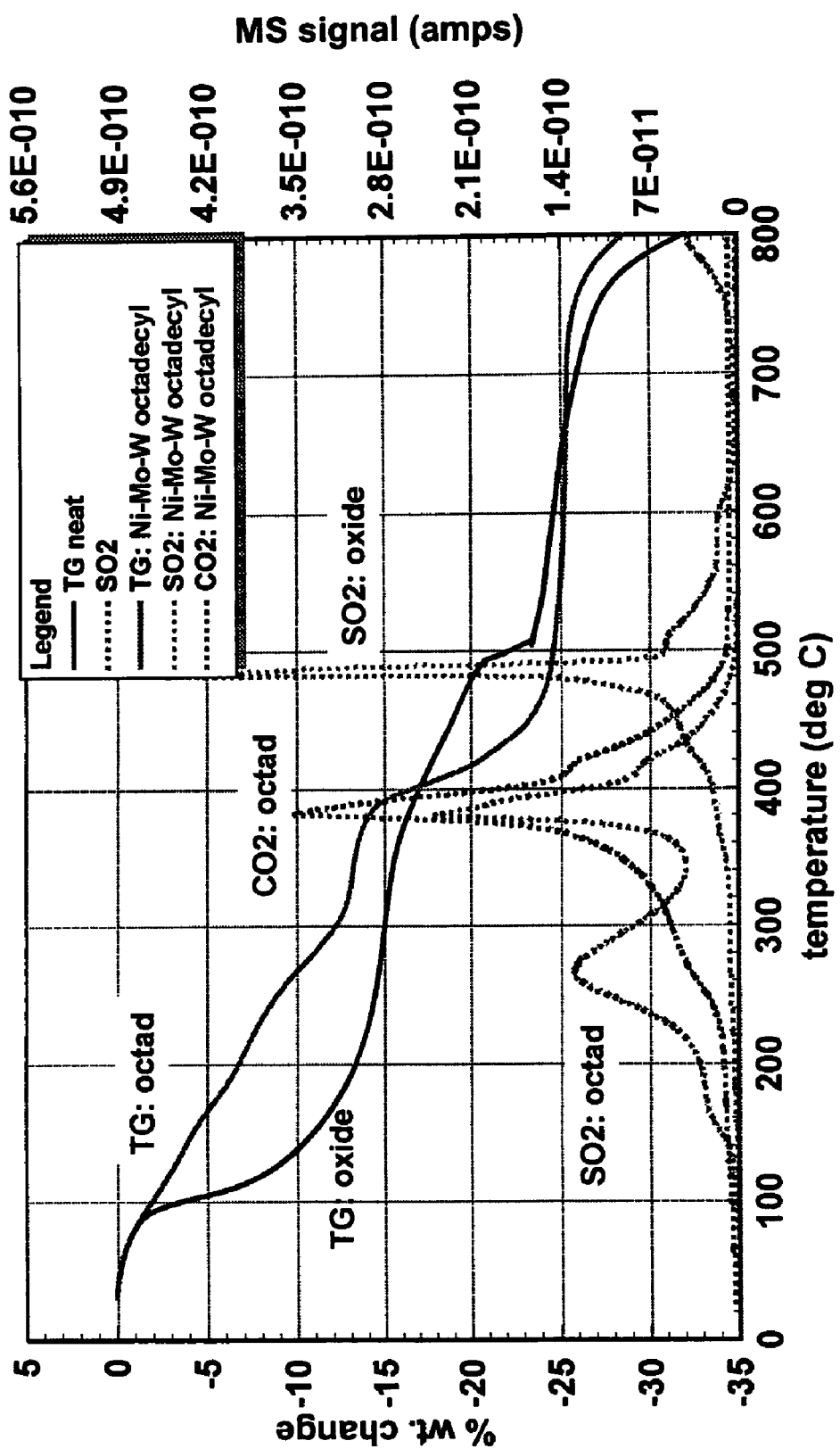
FIG. 4 is a plot of the TG/MS data obtained in Example 5 hereof and evidences the formation of carbosulfide crystallites prepared by the organic agent method of Example 2 hereof versus the crystallite formed in accordance with the prior art neat oxide method of Example 1 hereof.

About 70 mg of the catalyst compositions from Example 3 were loaded into a Mettler TGA 851 thermal balance, which was interfaced with a Balzers Thermostar quadrupole mass spectrometer equipped with a secondary electron multiplier. The catalyst compositions were heated at 4° C./min from room temperature to 600° C. in flowing air (50 cc/min) at one atmosphere total pressure. The MS signal in amps for the m/e fragments of 18 ($H_2O$), 44 ($CO_2$) and 64 ($SO_2$) together with the weight change are plotted and shown in FIG. 4 hereof. It will be noted in FIG. 4 that the $CO_2$ and $SO_2$ peaks from the sulfided organic agent precursor simultaneously emit at about 375° C. This indicates that the sulfided organic agent phase forms a carbosulfide. It will also be noted from FIG. 4 that the oxidation of the sulfide prepared from the oxide presursors have no $CO_2$ evolution and that the sulfide peak oxidizes at significantly higher temperature than the carbosulfide. This suggests that again the size of the [carbo]sulfide crystallite is smaller on the catalysts prepared from the organic agent than for the neat oxide precursor.

EXAMPLE 6

The hydrodesulfurization activity of the catalyst compositions of Examples 1 and 2 hereof were evaluated on a commercial atmospheric distillate containing 592 wppm sulfur, 100 wppm nitrogen at 650 psig, 625° F. and a 2 LHSV (liquid hourly space velocity). The results are shown in Table 1 below.

TABLE 1

| Sample # | Composition | Ni—Mo—W vol. K | wt. K |
|---|---|---|---|
| 21649-8 | $Ni_{1.5}Mo_{.5}W_{.5}$ rt 3 | 11 | 7.7 |
| 21893-87 | $NiMo_{.5}W_{.5}(ODTA)_{.75}$ | 9.0 | 10.0 |

ODTA = octadecyltrimethylammonium

The ODTA sample had approximately 35 wt. % of carbon following sulfidation. The gravimetric rate constants (using first-order kinetics) have been corrected for the amount of Ni—Mo—W present in each sample. Consequently, the data of the above table shows that the ODTA containing precursor produces a more active catalyst for the weight of Ni—Mo—W that is charged to a reactor.

The invention claimed is:

1. A bulk multi-metallic catalyst composition represented by the formula:

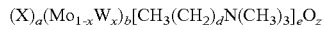

$(X)_a(Mo_{1-x}W_x)_b[CH_3(CH_2)_dN(CH_3)_3]_eO_z$ wherein X is one or more Group VIII non-noble metals, d is an integer from about 10 to about 40, x is between 0 and 1, the molar ratio of e:a is $\leq 2.0/1$ and $z=((2a+6b)+e)/2$ and the molar ratio of a: (b) is 0.5/1 to 3/1;

and wherein said catalyst composition after sulfidation is comprised of stacked layers of $(Mo_{1-x}W_x)S_2$ stoichiometry, such that the average stack height is about 10 Å to about 20 Å.

2. The catalyst composition of claim 1 wherein the molar ratio of a:b is from about 0.75/1 to about 1.5/1.

3. The catalyst composition of claim 1 wherein d is from about 16 to about 20.

4. The catalyst composition of claim 3 wherein d is about 18.

5. The catalyst composition of claim 1 wherein c is from about 0.5 to about 1.5.

6. The catalyst composition of claim 1 wherein X is selected from Ni and Co.

7. A method for preparing a catalyst precursor composition represented by the formula:

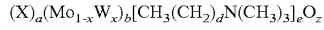

$(X)_a(Mo_{1-x}W_x)_b[CH_3(CH_2)_dN(CH_3)_3]_eO_z$ wherein X is one or more Group VIII non-noble metals, d is an integer from about 10 to about 40, x is between 0 and 1, the molar ratio of e:a is $\leq 2.0/1$ and $z=((2a+6b)+e)/2$ and the molar ratio of a: (b) is 0.5/1 to 3/1; which method comprises:

(a) preparing a first aqueous solution of a Group VIII non-noble metal water soluble salt;

(b) preparing a second aqueous solution containing Mo and W water soluble salts;

(c) heating both said first and second solutions to a temperature from about 60° C. to about 150° C.;

(d) adding an effective amount of an organic agent into said second aqueous solution;

(e) introducing at least a portion of said second aqueous solution of step (d) into said first aqueous solution; and (f) heating the resulting solution of step (e) to an effective temperature to cause the precipitation of said catalyst precursor composition.

8. The method of claim 7 wherein the Group VIII non-noble metal is selected from Ni and Co.

9. The method of claim 8 wherein the Group VIII non-noble metal is Ni.

10. The method of claim 7 wherein the salt of the Group VIII non-noble metal is selected from the group consisting of sulfate, nitrate, bromide, chloride, and acetate.

11. The method of claim 7 wherein the Mo salt is an ammonium salt selected from the group consisting of ammonium dimolybdate, ammonium tri-, tetra- hepta-, octa-, and tetradeca-molybdate.

12. The method of claim 7 wherein the W salt is an ammonium para-, meta-, hexa-, and polytungstate.

13. The method of claim 7 wherein the organic agent is selected from the group consisting of aromatic amines, cyclic aliphatic amines and polycyclic aliphatic amines.

14. The method of claim 13 wherein the organic agent is a $C_4$ to $C_{20}$ aromatic amine.

15. The method of claim 7 wherein the catalyst precursor composition is formed in a suitable catalyst shape and dried.

16. The method of claim 15 wherein the shaped and dried catalyst shape is calcined at a temperature from about 100° C. to about 600° C. in the presence of oxygen.

17. The method of claim 16 wherein the shaped, dried, and calcined catalyst shape is sulfided in the presence of a sulfur-containing compound at sulfiding conditions.

18. The method of claim 17 wherein the sulfur-containing compound is selected from the group consisting of elementary sulfur, hydrogen sulfide, and polysulfides.

* * * * *